Nov. 16, 1926.

J. F. BRICE

MOTOR

Filed Oct. 11. 1922

WITNESSES

INVENTOR
John F. Brice
BY
ATTORNEYS

Nov. 16, 1926.
J. F. BRICE
1,607,431
MOTOR
Filed Oct. 11, 1922    2 Sheets-Sheet 2
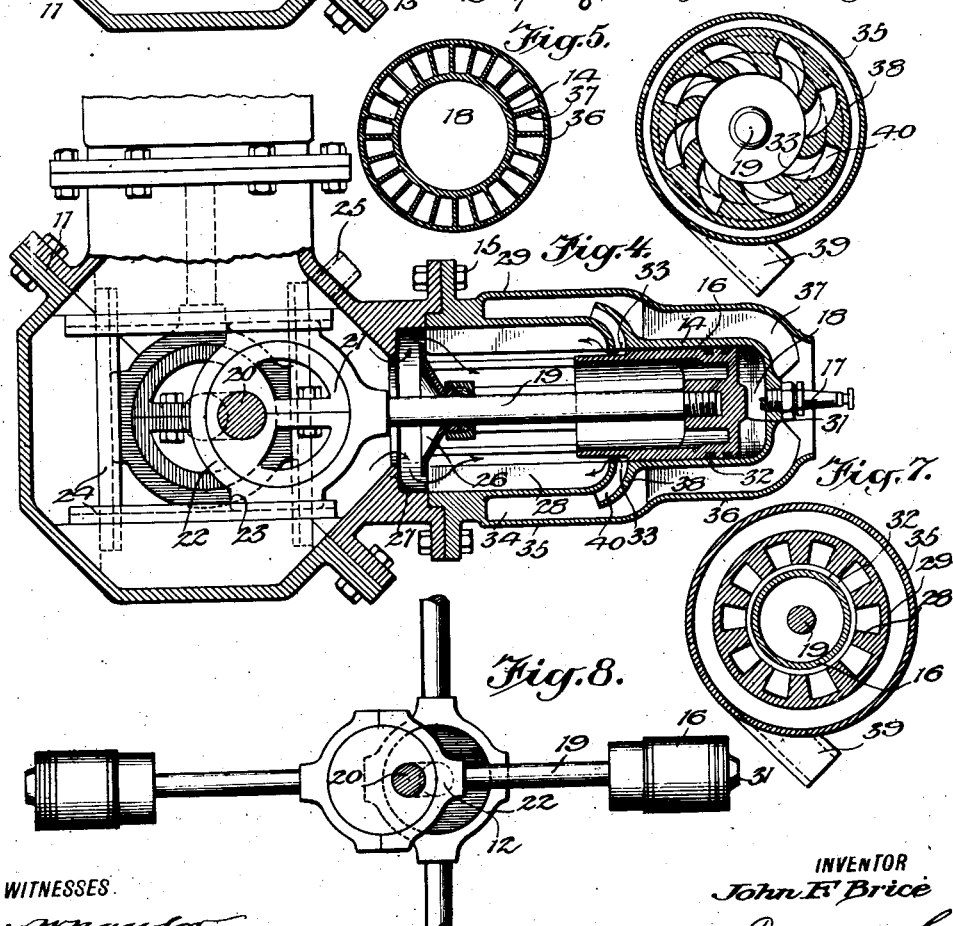
INVENTOR
John F. Brice
BY
ATTORNEYS
WITNESSES Patented Nov. 16, 1926.

1,607,431

UNITED STATES PATENT OFFICE.

JOHN FRANCIS BRICE, OF BENSALEM TOWNSHIP, BUCKS COUNTY, PENNSYLVANIA.

MOTOR.

Application filed October 11, 1922. Serial No. 593,899.

My invention relates to a motor, and aims to provide a device of this character which shall present certain improved construction over motors heretofore developed.

Primarily it is an object of the present invention to provide a motor utilizing as a source of power internal combustion, which motor will be more applicable than motors heretofore proposed, and which will develop more power than the usual construction of engine although my improved motor may employ the same bore and stroke, this saving being effected in accordance with manners hereinafter brought out.

A further object of my present invention is that of providing a motor which is preferably of the two-cycle type, which will operate more efficiently than is usual in motors of this type.

Another object of my present invention is that of providing a motor of the type specified in the preceding paragraph in which the fuel mixture will be efficiently compressed, and, furthermore, distributed in such a manner that no danger of an explosion flashing through the combustion chamber or crank case will exist.

Still another object of this invention is that of providing an internal combustion motor in which the fuel mixture will be efficiently vaporized incident to the fact that the products of combustion will be distributed in a manner serving to achieve this result in the best possible way.

Still a further object of my invention is that of constructing a motor which shall embody a cooling structure utilizing air as its cooling fluid, the flow of air being induced automatically upon the motor operating, this induction being preferably accomplished by the action of the flow of the products of combustion.

My invention further contemplates a motor of the nature specified in which the products of combustion may readily be discharged in a most desirable manner, and in which a subsequent fuel charge will be introduced with a maximum of efficiency into the combustion chamber.

A still further object of my invention is that of providing a structure serving to connect the piston to the crank shaft, which structure will permit of the transmission of motion from the rods associated with the piston to the crank shaft without the former oscillating as is now necessary in a reciprocating type of motor, avoiding the vibration which is now existent in all types of reciprocating motors due to the unbalanced reciprocating parts, this form of connection being capable of being used in connection with a single or block type of motor particularly, and noticeably efficient when used in association with a V or X radial type of motor.

With these and further objects in mind my invention contemplates the provision of a motor including a cylinder and a piston movable within said cylinder, together with a crank shaft arranged adjacent to the cylinder, and connected thereto, by mechanism which will transmit the reciprocating motion of the piston in a most efficient manner to the crank shaft and translate the same into rotary movement together with means serving to compress unexploded fuel charges in a desirable manner and to introduce the same into the combustion chamber efficiently, as well as to discharge the products of combustion in a manner serving first to efficiently vaporize the fuel charge and secondly to induce a flow of cooling fluid around the cylinder to maintain the parts at a non-explosive temperature.

Reference is had to the attached sheet of drawings as illustrating a practical embodiment of my invention, and it will be seen in these drawings that—

Figure 3 is a fragmentary sectional view of one of the cylinders of said motor and showing the position of the parts during the introduction of the fuel mixture into the combustion chamber.

Figure 4 is a view similar to Figure 3 but showing the position of the parts at the time of the explosion occurring within the combustion chamber.

Figure 1:
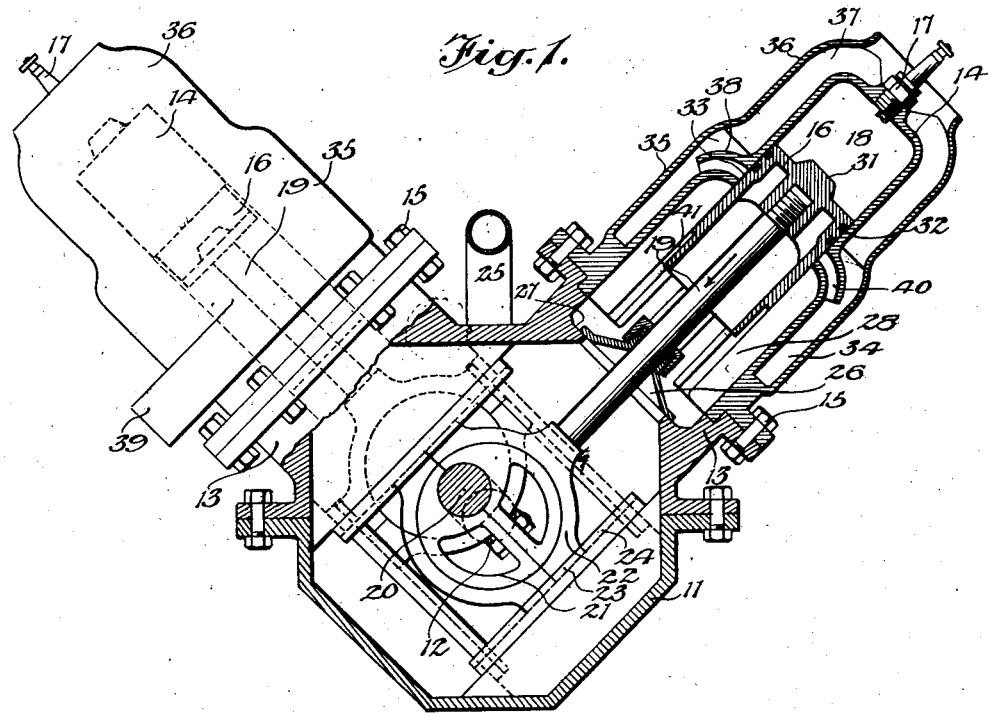
Figure 1 is a partly sectional side view of a V-type of motor embodying my improved construction.
Figure 2:
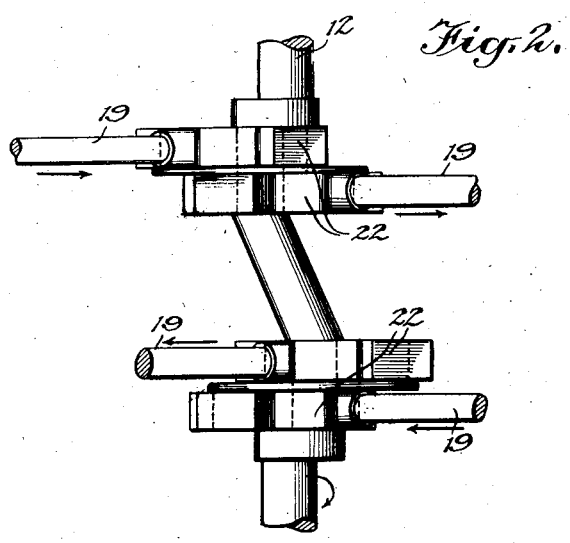
Figure 2 is a fragmentary plan view of the crank shaft and associated mechanism of the same.

Figures 5, 6 and 7 are transverse sectional views taken along the lines 5—5, 6—6 and 7—7 of Figure 3.

Figure 8 is a view of the crank shaft and associated mechanism of a radial X-type of motor.

It will be seen in these views that the reference numeral 11 indicates the crank case of any desirable conventional construction within which a crank shaft 12 is positioned, it being understood that the latter may be of any desired type. Also in the embodiment illustrated I have shown a V-type of motor, and thus the reference numeral 13 indicates the base portions to which cylinders 14 may be attached by any suitable means such as bolts 15, it being further noted that a piston 16 is slidably positioned within each of the cylinders 14, and that any suitable fuel igniting means such as a spark plug 17 may be provided for the purpose of causing an explosion within the combustion chamber 18 of each cylinder.

Contrary to conventional construction, however, it will be seen that the piston rods 19 are fixedly attached one to each of the pistons 16 and these rods are immovable with respect to the piston with which they are associated or, in other words, contrary to the usual connection between these elements, they are not permitted to oscillate. Rotatably mounted on the crank portions 20 of the shaft 12 are multiple eccentric blocks consisting of eccentric disks 21 oppositely disposed relative to one another on the cranks and attached together. In the embodiment illustrated in which a V-type of motor has been shown, the eccentric disks adjacent each other are either fixedly attached to one another or formed in one integral unit. An eccentric strap 22 encircles each of these eccentric disks and is fixedly attached to one of the rods 19, it being noted that the eccentric straps may be provided with extended portions 23 operating in guideways 24 extending longitudinally of the cylinder 14 and disposed within the crank case.

Thus it will be obvious that upon the pistons reciprocating, the rods 19 will reciprocate with them, and this reciprocating motion will be transmitted to the eccentric straps 22 and, incident to the fact that these straps are positively guided and further for the reason that the eccentric disks 21 rotatably encircle the crank portions 20 of the shaft 12, these disks will rotate about the crank portion 20. This movement will obviously result in the shaft 12 being rotated, and thus the reciprocation of each of the pistons 16 will be translated into rotary movement on the part of the shaft 12 without the necessity of an oscillation of the rods 19.

It will now be seen, with respect to the discharge of the products of combustion and the intake of a fuel charge, that I connect a carburetor (not shown) preferably to the crank case 11 by an intake pipe 25, and it will be noted that a valve in the nature of a cone 26 is slidably mounted upon each of the rods 19, and has as its valve seat an inwardly extending flange portion 27 which may form a part of the crank case 11. The movement of this valve is limited by, first, contact with the said flange, and, secondly, by engagement with the inner ends of a series of inwardly projecting longitudinally extending ribs 28 arranged within an enlarged portion 29 of the cylinder and at a point below the combustion chamber 18 thereof.

Thus as in Figure 1, in which the piston is moving inwardly, or towards the crank case, as has been indicated by the arrow, the valve will be seated, and any fluid such as fuel mixture between the piston 16 and the said valve and within the space provided by the enlarged portion 29 will be compressed. Upon the piston reaching its innermost position, as has been shown in Figure 3, the body of the same will pass beyond the upper ends of the spaces 30 extending between the ribs 28 and the compressed fuel charge will now flow, as has been indicated in Figure 3, into the combustion chamber 18, it being noted that this action is facilitated incident to a centrally raised portion 31 which may be associated with the piston, and which will act as a deflector for this flow of fluid.

It is to be noted in this connection that the ribs 28, as has been best shown in Figure 7, are arranged in a radial series so that the piston rings 32 associated with the piston 16 and the body of the latter itself will be properly guided and confined. In other words, as the piston moves into the enlarged portion 29 of the cylinder it is obvious that the piston rings will tend to spring free of their grooves, and it is to avoid this tendency and to guide the piston body that the said ribs are provided, it being, of course, understood that these elements serve a distinct purpose in that, first, they dissipate the heat to a certain extent, secondly, vaporize the incoming fuel charge in a manner hereinafter described, and, thirdly, due to the spaces 30 existing between them, act as conducting channels for the fuel charge.

On the other hand, as the piston now moves outwardly it carries with it the valve 26 until the latter engages the inner ends of the ribs 28, as has been shown in Figure 4, and due to the suction which will now be existing within the enlarged portion 29 of the cylinder, incident to the movement of the piston, a fuel charge will be sucked into the space thus provided and past the valve 26, as has been indicated by arrows in Figure 4. Upon the piston again moving inwardly, as in Figure 1, the valve 26 will immediately seat and the fuel charge will be compressed, and upon the upper edge of the piston 16 moving beyond the upper ends of the spaces 30 the compressed fuel charge will flow into the combustion chamber, this entire cycle of operation being repeated again and again as the motor operates.

Now with a view of disposing of the products of combustion it will be seen that I provide ports 33 in the cylinder walls and at points beyond the upper ends of the spaces 30, and these ports communicate with a space 34 provided by a jacket 35 encircling the enlarged portion 29 of the cylinder so that these products of combustion will flow into the space, and incident to the fact that the inner wall of this space is formed by the outer wall of the enlarged portion 29, and for the reason that the mixture being compressed is in contact with this wall it will be obvious that the said mixture will be vaporized by the flow of the products of combustion, which vaporization is further facilitated by the provision of the ribs 28 which are directly associated with the walls of the enlarged cylinder portion. Thus the heat of the products of combustion is not alone dissipated in a most convenient manner but this heat is utilized for a distinct purpose, that of vaporizing the mixture, and wastage is consequently reduced to a minimum.

Now with a view of providing a cooling structure for the motor, it will be noted that the jacket 35 is extended, as has been indicated at 36, and this extension encircles, and is spaced from the upper end of the cylinder 14, and it is to be noted that fins 37 are secured to the exterior of the cylinder 14 and extend to the inner face of the portion 36 so as to provide a maximum of heat radiating surface. Moreover, arranged adjacent to the ports 33 is a shield 38 which has its outer edge bent downwardly within the space existing between the jacket and the enlarged portion 29 of the cylinder.

Thus the products of combustion upon the ports 33 being uncovered are deflected downwardly into this space and flow therefrom through a pipe 39, it being noted that the passages 40 within the shield 38 and forming continuations of the ports 33 are preferably twisted, as has been shown in Figure 6, so that the products of combustion in flowing through this passage, and into the space aforementioned will be given a twisting or whirling motion as well as a downward movement. This will cause a high degree of suction to be exerted between the cylinder 14 and the extended portion 36 of the jacket, and thus air is induced to flow into the upper end of the jacket and to cool the fins 37 and the exterior wall of the cylinder 14 thus reducing the temperature of the parts, it being further noted that the highly heated products of combustion emerging from the passages 40 will also be cooled to a certain extent by the introduction of this air into the same.

Thus summing up the operation it will be seen that as the piston moves outwardly within the cylinder the same causes a suction to be exerted within the crank case 11 and past the valves 26 incident to the fact that each of the latter are in the position shown in Figure 4. This suction will be transmitted through the pipe 25 to the fuel mixture producing device, and thus fuel mixture will flow into the crank case. However, upon the crank case being filled with explosive mixture, the same will be drawn past the valve 26 upon the piston moving outwardly, and upon the piston moving inwardly during the firing stroke this fuel mixture will be compressed up until that time at which the upper edge of this member passes beyond the upper ends of the spaces 30, upon which point the mixture will flow in the manner indicated by the arrows in Figure 3, and into the combustion chamber 18.

The piston will now move outwardly and further compress the mixture within the combustion chamber, and upon said piston reaching the position shown in Figure 4 the mixture will be ignited and an explosion will occur which will initially seat the valve 26, and secondly compress the mixture within the enlarged portion 29 of the cylinder, which mixture has been drawn into this part during the outward stroke of the piston, as aforedescribed. Upon the piston uncovering the ports 33 the exploded fuel charge will flow therefrom through the passages 40 and thence through the space 34 at which point it will cause a complete vaporization of the incoming fuel, as has also been aforebrought out, attention being again invited to the fact that incident to the flow of mixture in this manner, air will be sucked through the extended portion 36 of the jacket through contact with the outer walls of the cylinder 14, and the fins 37 will cool this part of the motor and also bring the products of combustion, due to intermixture therewith, to a temperature which although high will not be excessive, and thus serve to avoid any danger in this connection. The piston will now again move outwardly and this cycle will be repeated again and again during the operation of the motor, but it is to be noted that I preferably provide a skirt portion 41 at the lower end of the piston, which skirt portion, when the piston is in its outermost position as in Figure 4, permits of the flow of the inert gas into the upper ends of spaces 30 thus forming a protective cushion for the fuel charge within the enlarged portion 29 of the cylinder, which cushion of inert gas will subsequently enter the combustion chamber 18 ahead of the fuel mixture, this action of the parts being indicated in Figures 3 and 4.

It will obviously be appreciated that while I have shown a V-type of engine that a radial type may utilize the invention herewith disclosed to equal advantage, it being noted in this connection as in Figure 8 that a series of radially extending crank rods are provided, two of which are preferably attached to each of the eccentric straps 22. It will readily be seen that a construction such as this shown in Figure 8 may dispense with the use of any special guides such as 24. The two pistons at opposite ends of a pair of rods serve to guide the rods in their rectilinear motion, the pistons being guided by their respective cylinders.

I would state in conclusion that while the illustrated examples show practical embodiments of my invention I do not limit myself strictly to the exact details herein illustrated since manifestly the same can be considerably varied without departing from the spirit of the invention as defined in the appended claims.

Claims:

1. In a multicylinder engine including a crank case through which the explosive charge is fed, a plurality of cylinders having charge receiving chambers formed on their inner ends into which the crank case opens spaced about the crank case, pistons in the cylinders, valves controlled by the piston and controlling the flow of the charge from the crank case into the charge receiving chambers, means for conveying the charge from the charge receiving chambers and circumferentially distributing it about the cylinders above the pistons, means located above the charge delivering means for carrying off the products of combustion, and means for utilizing the products of combustion to circulate a cooling fluid about the cylinders.

2. In a multicylinder engine including a crank case through which the explosive charge is fed, a plurality of cylinders having charge receiving chambers formed on their inner ends into which the crank case opens spaced about the crank case, valves for controlling the flow of the charge into the charge receiving chambers, jackets enclosing the lower ends of the cylinders, a plurality of radial partitions extending longitudinally between the jacket and cylinder forming a plurality of passages for conveying the explosive charge from the charge receiving chambers and distributing it circumferentially about the cylinder above the piston, a plurality of tubes communicating with the cylinder above the charge delivery passages and extending spirally about said jacket, and means for utilizing the exhaust gases delivered through said tubes to circulate a cooling fluid.

3. In internal combustion engine construction, a device of the class described, comprising a crank case through which the explosive charge is fed, a cylinder having a charge receiving chamber formed on its lower end into which the crank case opens mounted on the crank case, a piston having a piston rod connected thereto slidably mounted in the cylinder, a valve slidably mounted on the piston rod for controlling the opening between the charge receiving chamber and the crank case, a plurality of inlet ports circumferentially spaced about the cylinder, means for conveying the charge from the charge receiving chamber to said inlet ports, a plurality of outlet ports located immediately above said inlet ports, a plurality of spiral tubes leading from said outlet ports, and means for utilizing the exhaust gases to circulate a cooling fluid and to heat the charge as it is conveyed into the cylinder.

4. In a motor, a cylinder having an enlarged inner portion for receiving the charge and discharging the same into the combustion chamber of the cylinder through a plurality of ports, the cylinder being provided with a jacket surrounding the same and with a plurality of inwardly extending exhaust ports opening into the space between the jacket and cylinder, valve controlled means for admitting the charge to the enlarged portion of the cylinder, and a piston in the cylinder and controlling the ports thereof and the admission valve.

5. A motor including a plurality of cylinders having pistons slidably mounted therein, a crank case, a crank shaft in the crank case, a space formed at the inner end of each cylinder for receiving the charge from the crank case, a valve for controlling the admission of the charge to said space, a plurality of circumferential spaced ports opening into each cylinder for conveying the charge into the same, means for utilizing the exhaust gases for circulating air about each cylinder to cool the same, piston rods connected to the pistons, and eccentrics interposed between the piston rods and crank shaft for transmitting motion to the latter.

6. A motor including in combination a cylinder, a piston movable within said cylinder, said cylinder presenting an enlarged portion, a crank shaft beyond said cylinder, a rod extending between said crank shaft and said piston, and being connected to these elements, said piston being adapted to move into the enlarged portion of said cylinder, and a valve carried by said rod and movable with respect thereto for sealing the lower end of said enlarged portion to the crank case whereby any fluid within the same will be pressed upon said piston moving inwardly.

7. In a multicylinder engine including a crank case having a plurality of cylinders spaced about the same and opening from it, a shaft rotatably mounted in the crank case, cranks evenly spaced about the shaft, multiple eccentric blocks mounted on the cranks, eccentric straps mounted on the multiple eccentric blocks, piston rods connecting the eccentric straps to pistons located in the cylinders, means for confining the eccentric straps to a rectilinear motion, valves slidably mounted on the piston rods for controlling the opening leading from the cylinders into the crank case, a jacket encircling said cylinder and spaced therefrom, partitions extending radially outward between the cylinder and jacket, and means associated with exhaust ports formed in the cylinder wall for utilizing the products of combustion to circulate a cooling fluid between the jacket and cylinder.

8. In a multicylinder engine including a crank case through which the explosive charge is fed, a plurality of cylinders having charge receiving chambers formed on their inner ends into which the crank case opens spaced about the crank case, each of said cylinders being provided with a circumferential row of intake ports and exhaust ports adjacent the intake ports, a shaft having a plurality of cranks formed thereon rotatably mounted in the crank case, multiple eccentric blocks mounted on the cranks, eccentric straps mounted on the multiple eccentric blocks, piston rods connecting the eccentric straps to pistons movably mounted in the cylinders, guides for confining the eccentric straps to rectilinear motion, valves slidably mounted on the piston rods for controlling the entry to said charge receiving chamber, said cylinder being formed with a plurality of passages for conveying the charge from the charge receiving chamber to the intake ports, a jacket encircling the cylinder and the charge conveying passages and spaced therefrom, and a plurality of spiral tubes associated with the outlet passages for directing the products of combustion about the charge conveying passages to heat the same and for circulating a cooling fluid about the cylinder.

9. In a multicylinder engine including a crank case through which the explosive charge is fed, a plurality of cylinders having charge receiving chambers formed on their inner ends into which the crank case opens spaced about the crank case, each of said cylinders being provided with a circumferential row of intake ports and exhaust ports adjacent the intake ports, a shaft having a plurality of cranks formed thereon rotatably mounted in the crank case, multiple eccentric blocks mounted on the cranks for movement in parallel planes, eccentric straps mounted on the multiple eccentric blocks, the straps carried by one eccentric block being arranged for movement at right angles to one another, piston rods connecting the eccentric straps to pistons movably mounted in the cylinders, guides for confining the eccentric straps to rectilinear motion, valves slidably mounted on the piston rods for controlling the entry to said charge receiving chamber, said cylinder being formed with a plurality of passages for conveying the charge from the charge receiving chamber to the intake ports, a jacket encircling the cylinder and the charge conveying passages and spaced therefrom, and a plurality of spiral tubes associated with the outlet passages for directing the products of combustion about the charge conveying passages to heat the same and for circulating a cooling fluid about the cylinder.

JOHN FRANCIS BRICE.